US008380490B1

(12) United States Patent
King

(10) Patent No.: US 8,380,490 B1
(45) Date of Patent: Feb. 19, 2013

(54) REUSABLE CONTROLS FOR AUTOMATICALLY TRANSLATING TEXT BETWEEN LANGUAGES

(75) Inventor: Dennis D. King, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1711 days.

(21) Appl. No.: 09/407,141

(22) Filed: Sep. 28, 1999

(51) Int. Cl.
*G06F 17/20* (2006.01)

(52) U.S. Cl. ............ 704/8; 704/2; 704/3; 704/4; 704/5; 704/7; 715/264

(58) Field of Classification Search .................. 704/2–8; 715/264; 707/536
See application file for complete search history.

(56) References Cited

U.S. PATENT DOCUMENTS

| | | | | |
|---|---|---|---|---|
| 5,416,903 A * | 5/1995 | Malcolm | ........................... | 704/8 |
| 5,434,776 A * | 7/1995 | Jain | ..................... | 704/8 |
| 5,652,884 A * | 7/1997 | Palevich | ........................... | 704/8 |
| 5,734,597 A * | 3/1998 | Molnar et al. | ..................... | 704/8 |
| 5,754,173 A * | 5/1998 | Hiura et al. | .................... | 345/333 |
| 5,900,871 A * | 5/1999 | Atkin et al. | ..................... | 715/866 |
| 5,907,326 A * | 5/1999 | Atkin et al. | ..................... | 715/866 |
| 5,917,484 A * | 6/1999 | Mullaney | ........................ | 345/333 |
| 6,092,036 A * | 7/2000 | Hamann | ............................ | 704/8 |
| 6,111,572 A * | 8/2000 | Blair et al. | ..................... | 715/703 |
| 6,233,620 B1 * | 5/2001 | Gish | ............................ | 709/303 |
| 6,334,101 B1 * | 12/2001 | Hetherington et al. | ........... | 704/8 |
| 6,411,948 B1 * | 6/2002 | Hetherington et al. | ........... | 707/2 |
| 6,496,844 B1 * | 12/2002 | Hetherington et al. | ....... | 715/536 |

* cited by examiner

*Primary Examiner* — David R Hudspeth
*Assistant Examiner* — Lamont Spooner
(74) *Attorney, Agent, or Firm* — Steven M. Greenberg, Esq.; Carey, Rodriguez, Greenberg & O'Keefe

(57) ABSTRACT

Methods, systems and computer program products provide reusable controls for automatically translating text with a reusable control by identify a plurality of variables comprising at least a source and a target language, identifying when translation should be invoked for text in the control and encapsulating said steps of initializing and identifying in order to make a reusable data object. Control objects for controlling text are also provide which include a text property for storing data corresponding to the text to be controlled by the control object, a translation language property which indicates a language to which the text to be controlled is to be translated and a translation method which performs translation of data in the text property.

18 Claims, 4 Drawing Sheets

REUSABLE CONTROLS FOR AUTOMATICALLY TRANSLATING TEXT BETWEEN LANGUAGES

FIELD OF THE INVENTION

This invention relates in general to computer software, and in particular to a method and system for a multi-lingual user interface control.

BACKGROUND OF THE INVENTION

There is currently a problem in the art of creating computer programs that manipulate and/or translate multi-lingual textual data. Although there are software routines and techniques that can be exercised by a developer to manipulate or translate this kind of data, the problem is generally left to the expertise of a developer to uniquely accomplish this each time it is necessary. Often this is a complex and time consuming effort, as there are currently no low level services (e.g. widgets or controls) that natively have Machine Translation (MT) and multi-lingual capability at their core. Programmers could achieve substantial productivity and quality improvements in applications requiring these capabilities if such controls existed.

For example, in the prior art, a developer would need to write code for any input or output control, for example, a textfield, that needed translation. This requires that the developer have a working knowledge of Machine Translation functionality as well as understand how to integrate and use it. Thus, the translation of the data in each control would be a tedious and code intensive operation.

SUMMARY OF THE INVENTION

The solution to this problem is the incorporation of Machine Translation technology into traditional (and/or new) controls that would extend and is a new use of those controls or objects. A TextField is an example of a common control in windowing systems and will be used herein as an example to illustrate the present invention. However, it is to be understood that the present invention can be abstracted to any type of control whether input, output, or non-visual. TextFields are common in Abstract Windows Toolkit ((AWT) which is a Java API that enables programmers to develop Java applications with GUI components, such as windows, buttons, and scroll bars), Swing (also a GUI component kit that is the follow-on to AWT that simplifies development of windowing components such as menus, dialogs, controls, etc.) and other user interface (UI) frameworks. The TextField is an object that provides basic editing capability for a single line of text. The essence of this invention is to add machine language translation capability to new controls, for example, as applied to the TextField, called the 'MultiLingualTextField'. This control operates like the traditional TextField with enhancements to it's properties, events and actions, as will be subsequently described in greater detail. Note that a single line TextField is used herein as an example only, but a multi-line edit (MLE) field with MT capability could act similarly. Other output controls such as a ListBox, Label, etc. could also operate with similar multi-lingual capability.

The present invention disclosed herein comprises a method of automatically translating text with a reusable control. The present invention allows a developer to make machine translation ready applications without the need for knowing how to write the code necessary to do so.

In accordance with one aspect of the invention, parameters are initialized to identify a plurality of variables comprising at least a source and a target language. It is then identified within the program as to when translation should be invoked for data in relevant controls. The parameters and invoking information are then encapsulated in order to make a reusable object. The parameters may further include a subject area, domains, transactional needs, and input and output locations. Additionally, the text may be found in an input field, an output field, or an object which has no visual representation.

These and other features, aspects, and advantages of the present invention will become better understood with reference to the following description, appended claims, and accompanying drawings.

BRIEF DESCRIPTION OF THE DRAWINGS

For a more complete understanding of the present invention and for further advantages thereof, reference is now made to the following Detailed Description taken in conjunction with the accompanying drawings, in which.

DETAILED DESCRIPTION OF THE INVENTION

Figure 1:
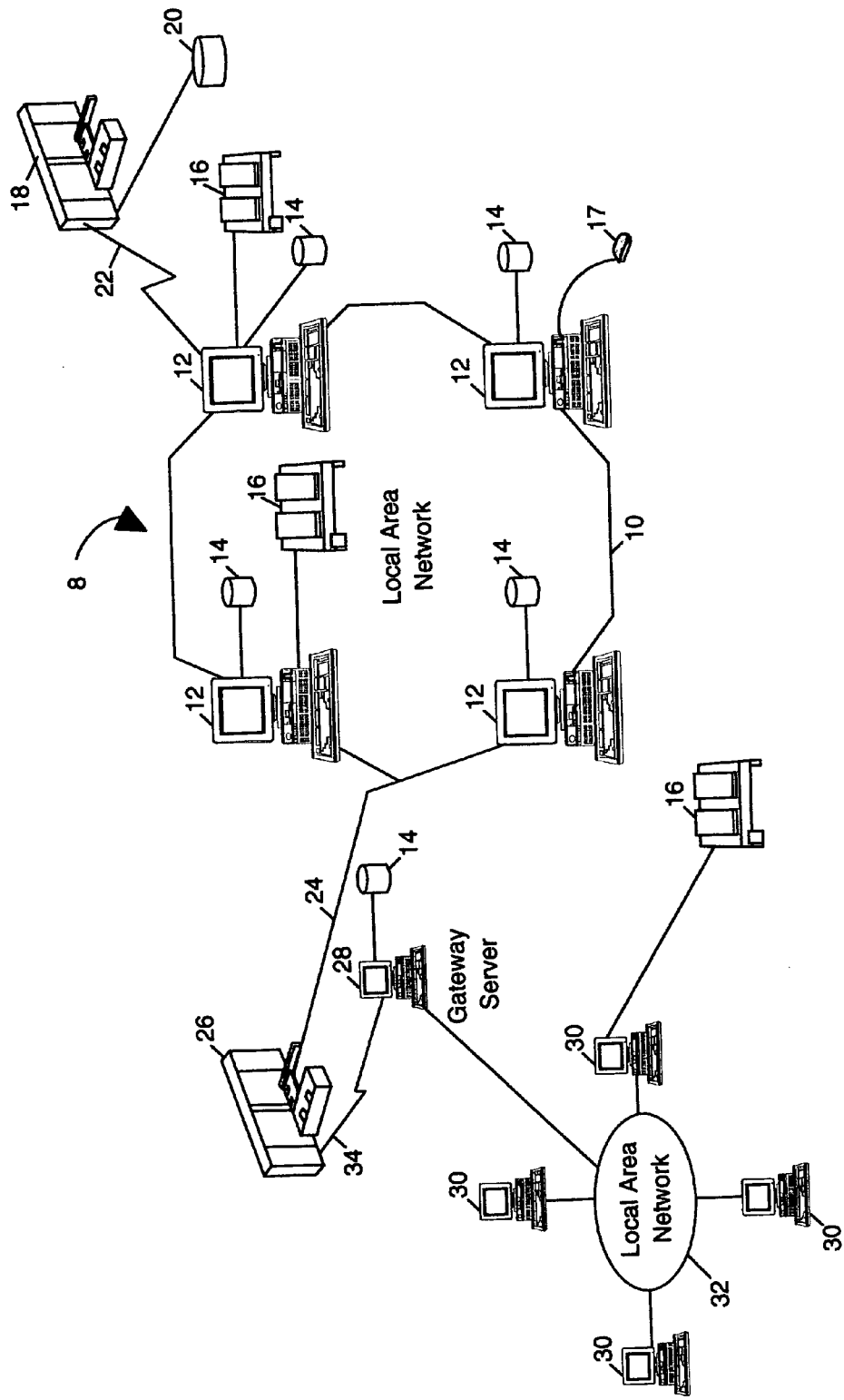
FIG. 1 is a pictorial representation of a data processing system which may be utilized to implement a method and system of the present invention.

Referring to FIG. 1, there is depicted a graphical representation of a data processing system 8, which may be utilized to implement the present invention. As may be seen, data processing system 8 may include a plurality of networks, such as Local Area Networks (LAN) 10 and 32, each of which preferably includes a plurality of individual computers 12 and 30, respectively. Of course, those skilled in the art will appreciate that a plurality of Intelligent Work Stations (IWS) coupled to a host processor may be utilized for each such network. Each said network may also consist of a plurality of processors coupled via a communications medium, such as shared memory, shared storage, or an interconnection network. As is common in such data processing systems, each individual computer may be coupled to a storage device 14 and/or a printer/output device 16 and may be provided with a pointing device such as a mouse 17.

The data processing system 8 may also include multiple mainframe computers, such as mainframe computer 18, which may be preferably coupled to LAN 10 by means of communications link 22. The mainframe computer 18 may also be coupled to a storage device 20 which may serve as remote storage for LAN 10. Similarly, LAN 10 may be coupled via communications link 24 through a sub-system control unit/communications controller 26 and communications link 34 to a gateway server 28. The gateway server 28 is preferably an IWS which serves to link LAN 32 to LAN 10.

With respect to LAN 32 and LAN 10, a plurality of documents or resource objects may be stored within storage device 20 and controlled by mainframe computer 18, as resource manager or library service for the resource objects thus stored. Of course, those skilled in the art will appreciate that mainframe computer 18 may be located a great geographic distance from LAN 10 and similarly, LAN 10 may be located a substantial distance from LAN 32. For example, LAN 32 may be located in California while LAN 10 may be located within North Carolina and mainframe computer 18 may be located in New York.

Software program code which employs the present invention is typically stored in the memory of a storage device 14 of a stand alone workstation or LAN server from which a developer may access the code for distribution purposes, the software program code may be embodied on any of a variety of known media for use with a data processing system such as a diskette or CD-ROM or may be distributed to users from a memory of one computer system over a network of some type to other computer systems for use by users of such other systems. Such techniques and methods for embodying software code on media and/or distributing software code are well-known and will not be further discussed herein.

Figure 2:
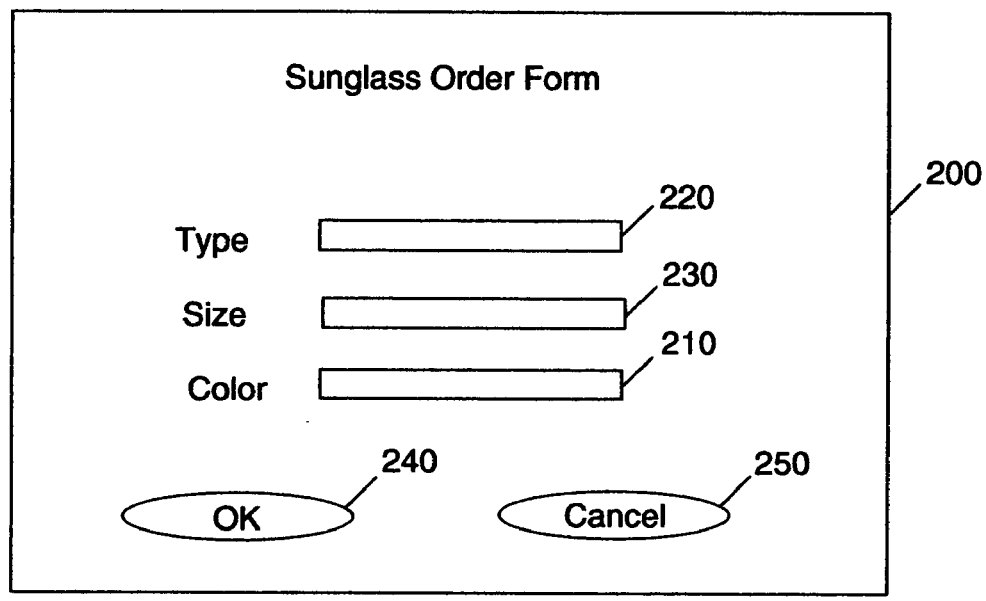
FIG. 2 is an illustration of a simple input text form.

Referring now to FIG. 2, consider a telephone order business that sells sunglasses. A form which may be used by the sales person taking an order is generally identified by reference numeral 200. This business is located in the United States and services domestic customers only due to import/export restrictions. However, the sunglasses are manufactured, warehoused and fulfilled in Germany, China and France. The warehouse and shipping personnel have access to the order entry database used in the US but only speak the native language of their respective countries. A clerical/administrative person who works the phones in the US, receives a customer order for example, for blue sunglasses of type SpeedRacer' in size 'Adult' (obviously, the product comes in many sizes, colors and types). The clerk enters the order information into the application's order entry form in English, placing 'Blue' into Color textfield 210, SpeedRacer' into Type textfield 220, and 'Adult' into Size textfield 230. The clerk then selects an 'OK' pushbutton 240 to send the order or a 'Cancel' pushbutton 250 to cancel the order. Any additional controls and fields can be placed on the form as appropriate, and it is to be understood that the form 200 is merely one possible example.

Since this order is to be processed in a country other than an English speaking one, the information on the order form must be translated into another language. Therefore, the form 200 needs to be provided with automatic programming functions when created that will accomplish the translation into the appropriate language. To accomplish this under the prior art, a developer must understand the details of general purpose Machine Translation (MT) Application Programming Interfaces (API's). These API's would likely be different for each Machine Translation vendor's product. Use of these API's must then be combined with each separate input, output or other control to provide a useful solution.

Figure 3:
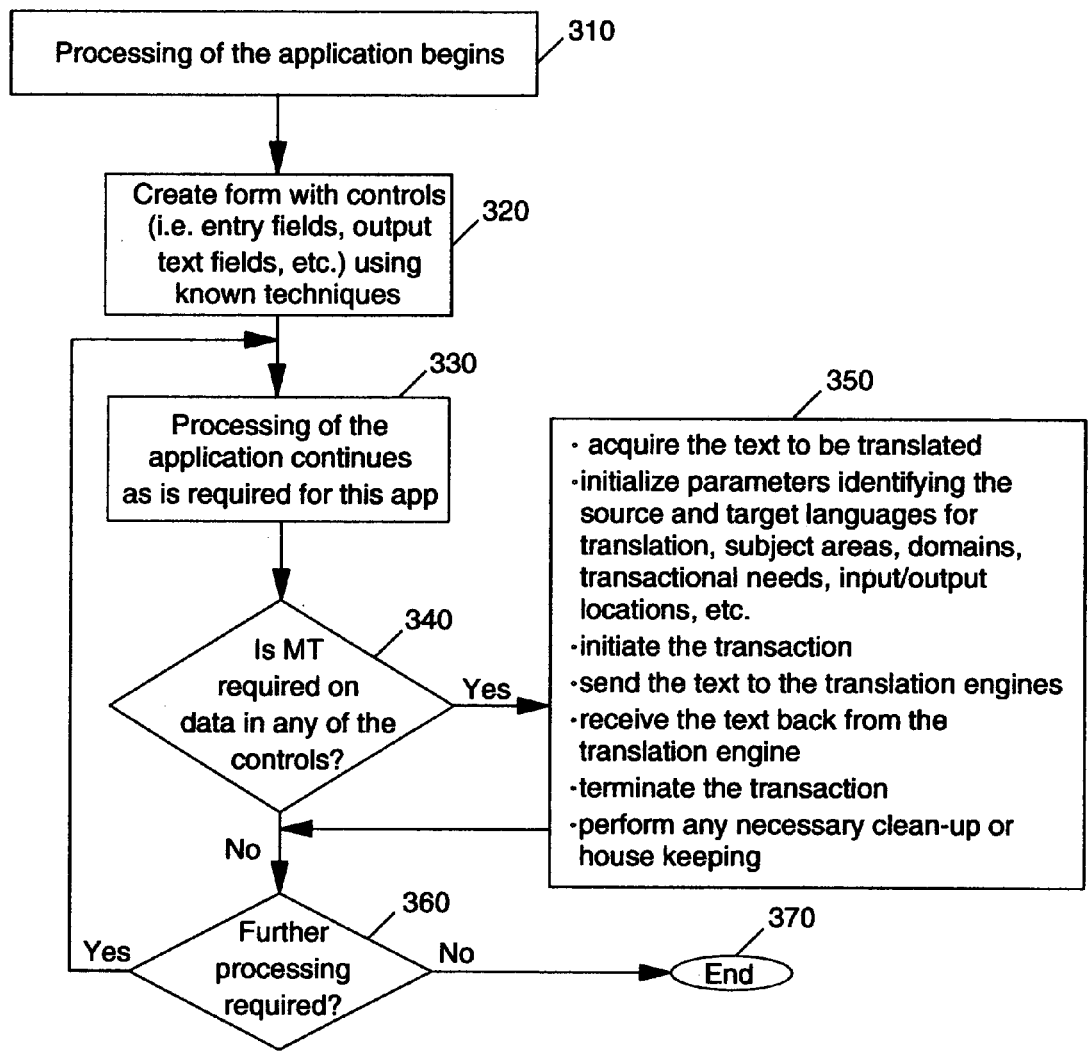
FIG. 3 is a flowchart illustrating a developer's process under the prior art.

Referring to FIG. 3, the steps a developer might art follow under the prior art to use MT in building a form based application are illustrated. At block 310, processing of the application begins.

At block 320, a typical form with various controls (i.e. entry fields, output text fields, etc.) is created in one of the many well known ways. At block 330, processing of the application continues, as required for this application. It is then decided at decision block 340, whether or not any MT is required. If the response to decision block 340 is yes, processing is conducted at block 350. When it is determined that MT is required then, the application developer must write code to do at least the following steps:

1) acquire the text to be translated out of the control or structure in which it resides;
2) initialize parameters identifying the source and target languages for translation, subject areas, domains, transactional needs, input/output locations, etc;
3) initiate the transaction;
4) send the text to the translation engines;
5) receive the text back from the translation engine;
6) terminate the transaction; and
7) perform any necessary clean-up or house keeping.

If the response to decision block 340 is no, or after block 350, the process proceeds to decision block 360. It is determined at decision block 360 whether or not further processing is required. If further processing is required, the process returns to block 330, as previously described above. If there is no further processing to be conducted, the developer would end at 370.

Figure 4:
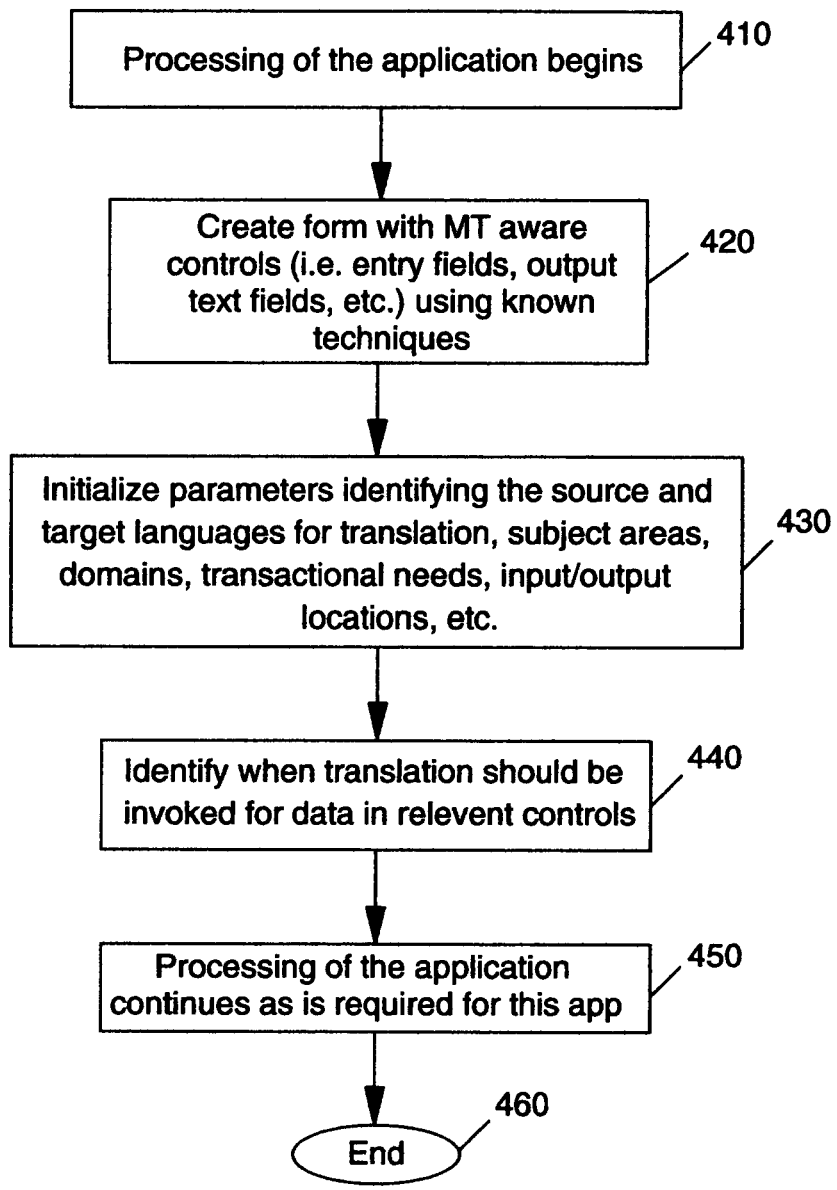
FIG. 4 is a flowchart illustrating a developer's process in accordance with the present invention.

Referring to the flowchart of FIG. 4, the steps a developer would utilize to prepare the same form application as above are illustrated in accordance with the present invention. At block 410, processing of the application begins. The developer will then create the form of FIG. 2 using known techniques, however, the controls will be MT aware controls. At block 430 parameters (within the reusable controls) are initialized to identify the source and target languages for translation, subject areas, domains, transactional needs, input/output locations, and etc. At block 440, the developer will identify when the translation should be invoked for data in relevant controls and simply calls the action in the control to perform the translation. Processing of any other portions of the application will then continue as required at block 450 and when completed, end at 460.

Thus, in accordance with the present invention, when the clerk enters the order data into the appropriate fields, the data is stored in English in the database in the US. Additionally, for example, an e-mail is automatically sent to the fulfillment location country. Upon receiving the e-mail, the fulfillment location country queries the remote US database to view the order. This query is in the native language of the fulfillment location country, however, this is not important to the present invention. When the English order data is placed in the form and prior to presenting it to the user for viewing, Machine Translation would be invoked to translate the data into the native language of the user. The order is then processed.

In order to further illustrate the differences between the prior art and the present invention, the following information is provided:

Examples of properties that a typical prior art TextField has are:

1) background color (the background color of the text field);
2) enabled (is the control active?);
3) name (the name of this control for use inside of a program);
4) size and position (the size and location of this control);
5) visible (is the control visible?);
6) echo character (the password echo character);
7) editable (can the text in this text field be changed?);
8) font (the font of the text);
9) foreground color (the color of the text); and
10) text (the text displayed in the text field).

Examples of events that a typical TextField could raise include:

1) enter key pressed (the enter key was pressed inside the text field);
2) got focus (the text field has gotten focus);
3) lost focus (the text field has lost focus);
4) mouse clicked (the mouse was clicked over the text field);
5) mouse entered (the mouse cursor moved over the text field);

6) mouse exited (the mouse cursor moved away from the text field);
7) mouse pressed (the mouse was pressed down over the text field);
8) mouse released (the mouse was released over the text field); and
9) text changed (the text in the text field has changed).

Examples of actions or methods that a typical TextField has:
1) setText—sets the text that is presented by this text component to be the specified text;
2) getText—gets the text that is presented by this text component;
3) getEchoChar—gets the character that is to be used for echoing;
4) setEchoChar—sets the echo character for this text field;
5) echoCharIsSet—indicates whether or not this text field has a character set for echoing;
6) getColumns—gets the number of columns in this text field;
7) setColumns—sets the number of columns in this text field;
8) getPreferredSize—gets the preferred size of this text field with the specified number of columns;
9) getMinimumSize—gets the minimum dimensions for a text field with the specified number of columns;
10) addActionListener—adds the specified action listener to receive action events from this text field;
11) removeActionListener—removes the specified action listener so that it no longer receives action events from this text field; and
12) processEvent—processes events on this text field.

The above properties, events and behaviors are very useful and productive to programmers when dealing with textual data in a particular human readable language. However, with the increased relevance of globalization, the ability to simply and easily use data in a multi-lingual manner is extremely valuable. Therefore, additional Properties in a MultiLingualTextField would include:
1) translationLanguage—the language to which the original text is to be translated;
2) translatedText—the translated version of the text property; and
3) useTranslatedText—a boolean indicator to identify that the setText and getText actions should use the translatedText property rather than the text property.

Additional Action in a MultiLingualTextField:
translate—perform translation on the text property and store it in the translatedText property using the language defined in the transationLaguage property.

Additional Event in a MultiLingualTextField:
translationComplete—indicates that the desired translation has completed.

Application Development Process

The developer that creates the order entry application illustrated by the form shown in FIG. 2 does so in a fashion similar to how it would be developed without the MultiLingualTextField capability with minor representative exceptions as follows:
1) New MultiLingualTextField( ) may be used rather than new TextField( ) when creating the form objects;
2) Using the scenario of the above example, the translationLanguage and the useTranslatedText properties must be programmatically set after a 'look up' to determine which country will fulfill the order; and
3) If the lostFocus event occurs and the useTranslationText property is set, a call to the translate method and then the setText method should be done.

Although the present invention has been described with respect to a specific preferred embodiment thereof, various changes and modifications may be suggested to one skilled in the art and it is intended that the present invention encompass such changes and modifications as fall within the scope of the appended claims.

What is claimed is:

1. A method of automatically translating text from a source language to a target language with a reusable control, comprising the steps of:
   initializing, by a processor, parameters to identify a plurality of variables comprising at least the source and the target language;
   identifying when translation should be invoked for text in a field of the control;
   encapsulating said steps of initializing and identifying in order to make a reusable data object; and
   wherein said text is inputted into the field.

2. The method of claim 1, wherein said step of initializing further comprises initializing a subject area.

3. The method of claim 2, wherein said step of initializing further comprises initializing domains.

4. The method of claim 3, wherein said step of initializing further comprises initializing transactional needs.

5. The method of claim 4, wherein said step of initializing further comprises initializing input and output locations.

6. A method of automatically translating text from a source language to a target language with a reusable control, comprising the steps of:
   initializing, by a processor, parameters to identify a plurality of variables comprising at least the source and the target language;
   identifying when translation should be invoked for text in a field of the control;
   encapsulating said steps of initializing and identifying in order to make a reusable data object; and
   wherein said text is outputted from the field.

7. A reusable automatic text translation control for translating text from a source language to a target language, comprising:
   means for initializing parameters to identify a plurality of variables comprising
   at least the source and the target language;
   means for identifying when translation should be invoked for text in a field of the control;
   means for encapsulating said steps of initializing and identifying in order to make a reusable data object; and
   wherein said text is inputted into the field.

8. The reusable automatic text translation control of claim 7, wherein said means for initializing further comprises means for initializing a subject area.

9. The reusable automatic text translation control of claim 8, wherein said means for initializing further comprises means for initializing domains.

10. The reusable automatic text translation control of claim 9, wherein said means for initializing further comprises means for initializing transactional needs.

11. The reusable automatic text translation control of claim 10, wherein said means for initializing further comprises means for initializing input and output locations.

12. A reusable automatic text translation control for translating text from a source language to a target language, comprising:
   means for initializing parameters to identify a plurality of variables comprising at least the source and the target language;

means for identifying when translation should be invoked for text in a field of the control;

means for encapsulating said steps of initializing and identifying in order to make a reusable data object; and wherein said text is outputted from the field.

13. A computer programming product recorded on computer readable storage device for automatically translating text from a source language to a target language with a reusable control, comprising:

computer readable means for initializing parameters to identify a plurality of variables comprising at least the source and the target language;

computer readable means for identifying when translation should be invoked for text in a field of the control;

computer readable means for encapsulating said steps of initializing and identifying in order to make a reusable data object; and wherein said text is inputted from the field.

14. The computer program product of claim 13, wherein said computer readable means for initializing further comprises computer readable means for initializing a subject area.

15. The computer program product of claim 14, wherein said computer readable means for initializing further comprises computer readable means for initializing domains.

16. The computer program product of claim 15, wherein said Computer readable means for initializing further comprises computer readable means for initializing transactional needs.

17. The computer program product of claim 16, wherein said computer readable means for initializing further comprises computer readable means for initializing input and output locations.

18. A computer program product recorded on computer readable storage device for automatically translating text from a source language to a target language with a reusable control, comprising:

computer readable means for initializing parameters to identify a plurality of variables comprising at least the source and the target language;

computer readable means for identifying when translation should be invoked for text in a field of the control;

computer readable means for encapsulating said steps of initializing and identifying in order to make a reusable data object; and wherein said text is outputted from the field.

\* \* \* \* \*